2,803,765

ANISOTROPIC PERMANENT MAGNETIC CYLINDRICAL MEMBER

Jan Timmerman, Drachten, Netherlands, assignor, by mesne assignments, to North American Philips Company, Inc., New York, N. Y., a corporation of Delaware Application November 15, 1954, Serial No. 468,881

Claims priority, application Netherlands November 16, 1953

4 Claims. (Cl. 310—156)

This invention relates to anisotropic, permanent magnetic cylindrical members, more especially but not particularly to an armature for electrical apparatus, and is characterized in that at least four poles of alternating polarity are provided along the cylindrical periphery so as to obtain at least substantially rectilinear mean paths of the lines of force between two opposed poles of opposite polarity, which extend substantially throughout their length parallel to each other and at least substantially also parallel to a single magnetic principal direction in the member.

Despite the very simple form of the cylindrical member in accordance with the invention, which is cast in one piece and cooled in a single magnetic field during the heat treatment so as to obtain only one principal direction, it is possible to provide the member with four or more (for example six or eight) poles during the ultimate magnetisation.

The provision of U-shaped recesses between the poles of particular shape and/or flats, as will be referred to later, is beneficial to the magnetic power, which is manifest by an increased motor- or generator power when using the member as an armature in electrical devices such as, for example, bicycle dynamos.

Figure 1:
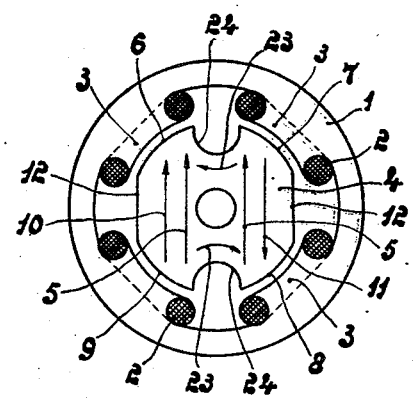
Figure 2:
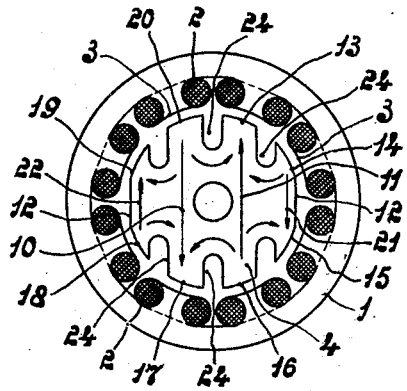

In order that the invention may be readily carried into effect, it will now be described, by way of example, with reference to the accompanying drawing, in which Figures 1 and 2 illustrate an application of the invention as a four pole and eight pole rotor, respectively.

Fig. 1 is a cross-section of an electrical device comprising a stator 1, windings 2, stator poles 3 and an anisotropic, permanent magnetic, cylindrical armature 4 in accordance with the invention. The armature may, for example be made from known Ni-Al-Co-Fe-alloy, for instance 24% Co, 14% Ni, 8% Al, 3% Cu and rest substantially Fe. Contrary to the shape shown in the drawing, the armature may be exactly circle-cylindrical and is hardened in a single substantially rectilinear magnet field during the cooling operation, thus obtaining the principal direction indicated by arrows 5. After cooling, the armature is eventually magnetized in the principal direction in a manner known per se whether or not in the stator, but in such manner as to obtain poles of alternating polarity at the periphery (6, 7, 8 and 9). The mean paths of the lines of force indicated by arrows 10, 11 are substantially rectilinear and extend at least substantially parallel both to each other and to the principal direction 5. During the ultimate magnetisation, parts indicated by arrows 23 will also be magnetized, due to the leakage flux between the poles, in directions at right angles to the magnetic principal direction, which means an additional profit.

The use of the U-shaped recesses 24 between the poles and the flats 12 extending substantially parallel to the principal direction and provided at the cylindrical periphery at two diametrically opposed points, yields a better effect.

Fig. 2 shows an 8-pole rotor of which the poles are denoted by 13 to 20. The arrows 10, 11, 21 and 22 indicate the mean paths of the lines of force, the arrow 21 for example also indicating, the magnetic principal direction. The limbs of the U-shaped recesses 24 extend at least substantially parallel to the path of the lines of force so that the represented cross-section of the cylindrical member exhibits H-shaped parts in order to avoid as much as possible constrictions in each magnet 19—18, 20—17, 13—16 and 14—15.

Contrary to conventional star-shaped armatures, Fig. 1 also has an H-shaped cross-section.

When using only two instead of three U-shaped recesses at each side of the armature at the correct location, a six-pole armature is obtained. All the poles are provided in such manner that the surface areas of the poles are equal, where the magnetic flux emerges or enters.

What is claimed is:

1. In an electrical device, a permanet magnetic, substantially cylindrical member constructed of anisotropic permanet magnet material and having a single principal direction of magnetization therein, said member being magnetized and having at least four poles of alternating polarity located around the periphery thereof such that the mean paths of the lines of force between opposed poles of unlike polarity, throughout substantially their entire length, are parallel to one another and substantially to said principal direction.

2. In an electrical machine, a rotor comprising one permanent magnetic, substantially cylindrical member constructed of anisotropic permanent magnet material and having a single principal direction of magnetization therein, said member being magnetized and having at least four poles of alternating polarity located around the periphery thereof such that the mean paths of the lines of force between opposed poles of unlike polarity, throughout substantially their entire length, are parallel to one another and substantially to said principal direction.

3. In an electrical machine as set forth in claim 2 wherein U-shaped recesses are provided at the periphery between at least some of the adjacent poles of opposite polarity, the U-shaped recesses extending substantially in the same direction as said principal direction.

4. In an electrical machine as set forth in claim 3 wherein opposed sides of the member are flat in said principal direction.

References Cited in the file of this patent

UNITED STATES PATENTS 2,691,112  Clifford _____ Oct. 5, 1954

FOREIGN PATENTS 150,142  Switzerland _____ Dec. 16, 1931